United States Patent [19]

Andrae

[11] 4,190,253
[45] Feb. 26, 1980

[54] CONTRACT BRIDGE DEVICE

[76] Inventor: Herbert H. Andrae, 88 Setauket Trail, Medford Lakes, N.J. 08055

[21] Appl. No.: 904,972

[22] Filed: May 11, 1978

[51] Int. Cl.² .............................................. G09B 19/22
[52] U.S. Cl. .......................................... 273/148; 35/8
[58] Field of Search ....................... 273/148 R; 35/8 B

[56] References Cited

U.S. PATENT DOCUMENTS

| | | | |
|---|---|---|---|
| 2,127,622 | 8/1938 | Stockton | 35/8 B |
| 2,193,745 | 3/1940 | Sterne | 35/8 B |

Primary Examiner—Anton O. Oechsle

[57] ABSTRACT

A solitary knowledgeable individual using the invention can, bid and then play an unlimited multiplicity of printed simulated contract bridge deals with exactly the same results and using the same rules, routines and tactics that he would have employed as a member of a conventional foursome. This ability is the result of programming all reasonable bids into a printed pattern that is cross indexed in such a manner that the bids in the user's hand will designate the responses in the other three hands and then the ability to play the hand just bid is made possible by programming into a geometric, printed pattern the four sets of playing Card Indicia simulating the hands along with two sets of Columnar Indicies, one corner bank of Pertinent Initial Leads, one corner bank showing a Plan of Attack, one corner bank of Sequence Adjustment Cues. Both the Bidding Cross and the Playing Square are presented as separate elements of the invention capable of independent functioning and independent pertinent employment but, brought together with minor adjustments in order to serve a more comprehensive purpose. For this reason the Bidding Cross and the Playing Square are presented in the printed form of the Deal Sheet and fitted with a Template, that with its matching patterns of apertures, slides and covers provides the means for the concealment and timely exposure of the underlying data on the Deal Sheet that rests in a Tray which serves to orient the Deal Sheet and the Template, and the types and complexity of the hands that can be programmed for the invention is limited only by the number of spaces within the Bidding Cross, which are variable at will, and the number of Pertinent Initial Leads and Sequence Adjustment Cues desired.

3 Claims, 26 Drawing Figures

FIG. 4

|   | A | B | C | D | E | X |
|---|---|---|---|---|---|---|
| 1 | ? | 3NT | DBL | 2D | ? | DBL |
| 2 | 4H | P | 4D | P | P | 4H |
| 3 | P | P | P | 5H | ? | P |
| 4 | ? | ? | ? | ? | ? | ? |
| 5 | ? | ? | ? | ? | ? | ? |

| A | B | C | D | E | X |   |
|---|---|---|---|---|---|---|
| P | 3S | 1N | 1S | ? | 1N | 1 |
| P | P | P | P | P | P | 2 |
| DB | P | DB | DB | P | ? | 3 |
| P | P | DB | P | P | ? | 4 |
| ? | ? | ? | ? | ? | ? | 5 |

BIDDING CRITIQUE

1st R'ND PASS: 1 BID NOT THERE, 2 DEMAND HIGHLY IMPROPER, 3 PRE-EMPT TOO HAZARDOUS WHEN VULNERABLE.

2nd R'ND BID 3: 2 BID WON'T SHOW TRUE STRENGTH AND MAY LEAVE YOU SHORT OF GAME.

PRE-BIDDING INFORMATION

EAST DEALER, BOTH VULNERABLE. POINT-COUNT BIDDING, BOTH PAIR, CONVENTIONS: BLACKWOOD, STAYMAN

|   | X | E | D | C | B | A |
|---|---|---|---|---|---|---|
| 1 | P | ? | ? | ? | ? | ? |
| 2 | 2C | P | P | 2C | P | P |
| 3 | P | P | P | P | P | P |
| 4 | P | P | P | P | P | P |
| 5 | ? | ? | ? | ? | ? | ? |

|   | A | B | C | D | E | X |
|---|---|---|---|---|---|---|
| 1 | ? | 3H | P | 1H | ? | P |
| 2 | 3H | P | 3D | 4H | 2H | 3H |
| 3 | 6H | P | 5H | 5D | 4H | P |
| 4 | P | RD | 6H | ? | ? | ? |
| 5 | ? | ? | ? | ? | ? | ? |

| 6S | 4S | 3S | QH | JH | 10H | 8H | 6H | 5H | 3C | AD | 6D | 4D |

FIG. 5

PLAN OF ATTACK (POA)

AFTER 1ST LEAD: 2 SPADE TRICKS AND MAYBE 3 ARE GOING TO BE LOST, WAIT FOR NEW SUIT TO FIRM UP PLAN.

AFTER 4TH LEAD: WHERE ARE THE KING OF CLUBS, THE KING OF HEARTS AND THE QUEEN OF DIAMONDS?

EAST BID CLUBS BUT IT WAS FORCED. WEST BID 2 NO-TRUMP ON HIS OWN, THAT SHOWS 16 POINTS AND HE'S SHOWN 9 IN SPADES ALREADY, WITH BOTH KINGS HE'S ONLY GOT 15 POINTS. HE MAY BE SHAVING IT 1 BUT I DOUBT 2. I'LL PLAY HIM FOR BOTH KINGS AND FINESSE THE QUEEN NOW. IF IT GOES AND THE HEARTS ARE SPLIT, I'M IN.

SEQUENCE ADJUSTMENT CUES (SAC)

1 IF TRUMPING IN ON A DIAMOND LEAD PLAY M-L-K IN WEST

2 IF DISCARDING ON CLUB QUEEN OR CLUB JACK PLAY H-J-I IN WEST

3 IF CONTRACT IS NO TRUMP LEAD "D"

4 IF DISCARDING ON A HEART LEAD PLAY D-E-F FROM EAST

5 IF PLAYING ON THE ACE OF CLUBS PLAY J-H-I FROM WEST
IF PLAYING ON THE QUEEN OR JACK OF CLUBS PLAY H-I-J FROM WEST

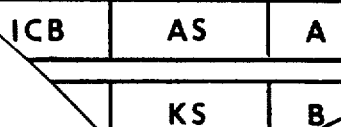

PERTINENT INITIAL LEADS (PIL)

ANY CONTRACT PLAYED BY NORTH
EAST LEADS "A"

ANY CONTRACT PLAYED BY SOUTH
WEST LEADS "C"

CRITIQUE OF THE PLAY OF THE HAND

SEE "PLAN OF ATTACK" FOR REASON FOR QUEEN OF CLUBS FINESSE. PROBLEM NOW IS TRANSPORTATION. LEAD JACK OF CLUBS AND TRUMP. FINESSE QUEEN AND JACK OF HEARTS AND NOTE EAST'S PLAY ON QUEEN AND DISCARD ON JACK. LEAVE HEARTS FOR TRANSPORTATION AND LEAD DIAMOND 4 TO KING. RETURN THE ACE OF HEARTS TO TAKE THE KING OF HEARTS. LEAD ACE OF CLUBS AND DISCARD THE 6 OF DIAMONDS. THE ACE OF DIAMONDS IS GOOD AND BALANCE OF HAND ARE TRUMPS.

BIDDING CRITIQUE

PRE-BIDDING INFORMATION
EAST DEALER, BOTH VULNERABLE.
POINT-COUNT BIDDING, BOTH
PAIR, CONVENTIONS: BLACKWOOD,
STAYMAN

FIG. 8
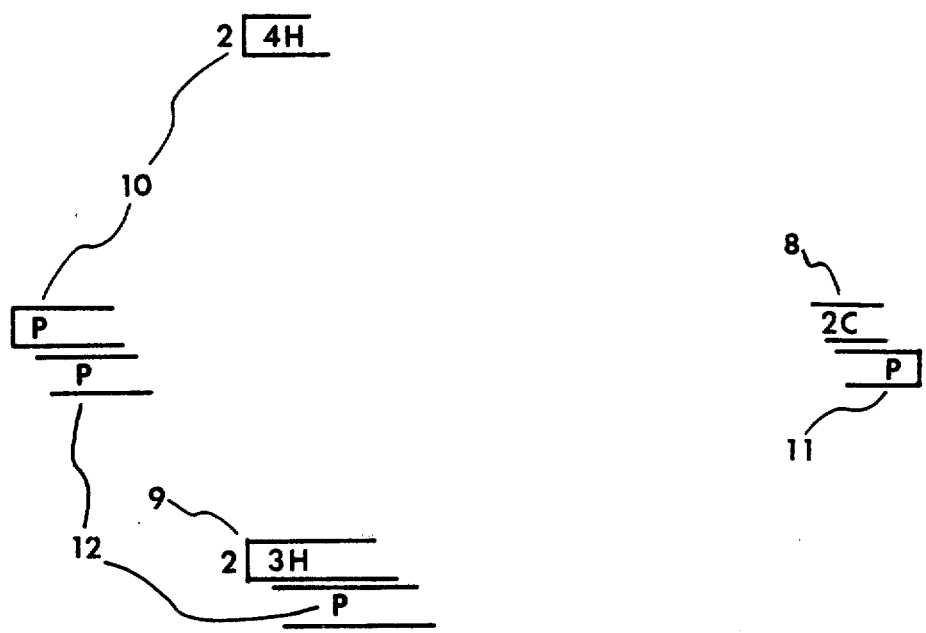
FIG. 9
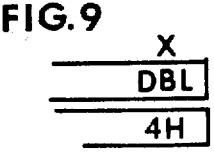
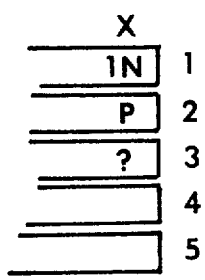
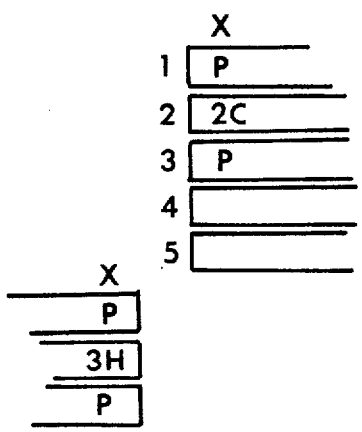

FIG. 10

|   | A | B | C | D | E | X |
|---|---|---|---|---|---|---|
| 1 | ? | 3NT | DBL | 2D | | |
| 2 | 4H | P | 4D | P | P | |
| 3 | | | | | | |

|   | A | B | C | D | E | X |
|---|---|---|---|---|---|---|
| 1 | P | 3S | 1N | 1S | | |
| 2 | P | P | P | P | P | |

|   | X | E | D | C | B | A |
|---|---|---|---|---|---|---|
| 1 | P | ? | ? | ? | ? | ? |
| 2 | | | P | 2C | P | P |
| 3 | | P | P | P | P | P |

|   | A | B | C | D | E | X |
|---|---|---|---|---|---|---|
| 1 | ? | 3H | P | 1H | | |
| 2 | 3H | P | 3D | 4H | 2H | |

FIG. 11

|   | A | B | C | D | E | X |
|---|---|---|---|---|---|---|
| 1 | ? | 3NT | | | | |
| 2 | | | | | | |

|   | A | B | C | D | E | X |
|---|---|---|---|---|---|---|
| 1 | P | 3S | | | | |
| 2 | P | P | | | | |

|   | X | E | D | C | B | A |
|---|---|---|---|---|---|---|
| 1 | P | ? | ? | ? | ? | ? |
| 2 | | | | | | P |

|   | A | B | C | D | E | X |
|---|---|---|---|---|---|---|
| 1 | ? | 3H | | | | |
| 2 | 3H | P | | | | |

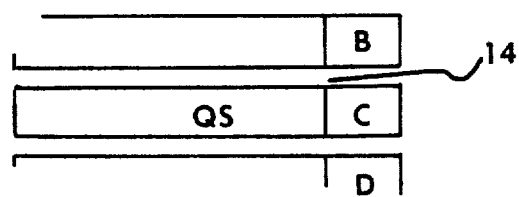
FIG. 12
PERTINENT INITIAL LEADS (PIL)
ANY CONTRACT PLAYED BY NORTH
EAST LEADS "A"
ANY CONTRACT PLAYED BY SOUTH
WEST LEADS "C"
PLAN OF ATTACK (POA)
AFTER 1ST LEAD: 2 SPADE TRICKS
AND MAYBE 3 ARE GOING TO BE
LOST, WAIT FOR NEW SUIT TO
FIRM UP PLAN.
FIG. 13
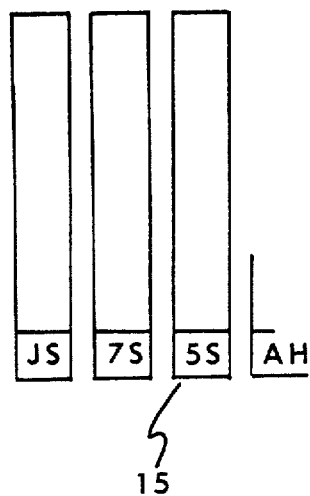

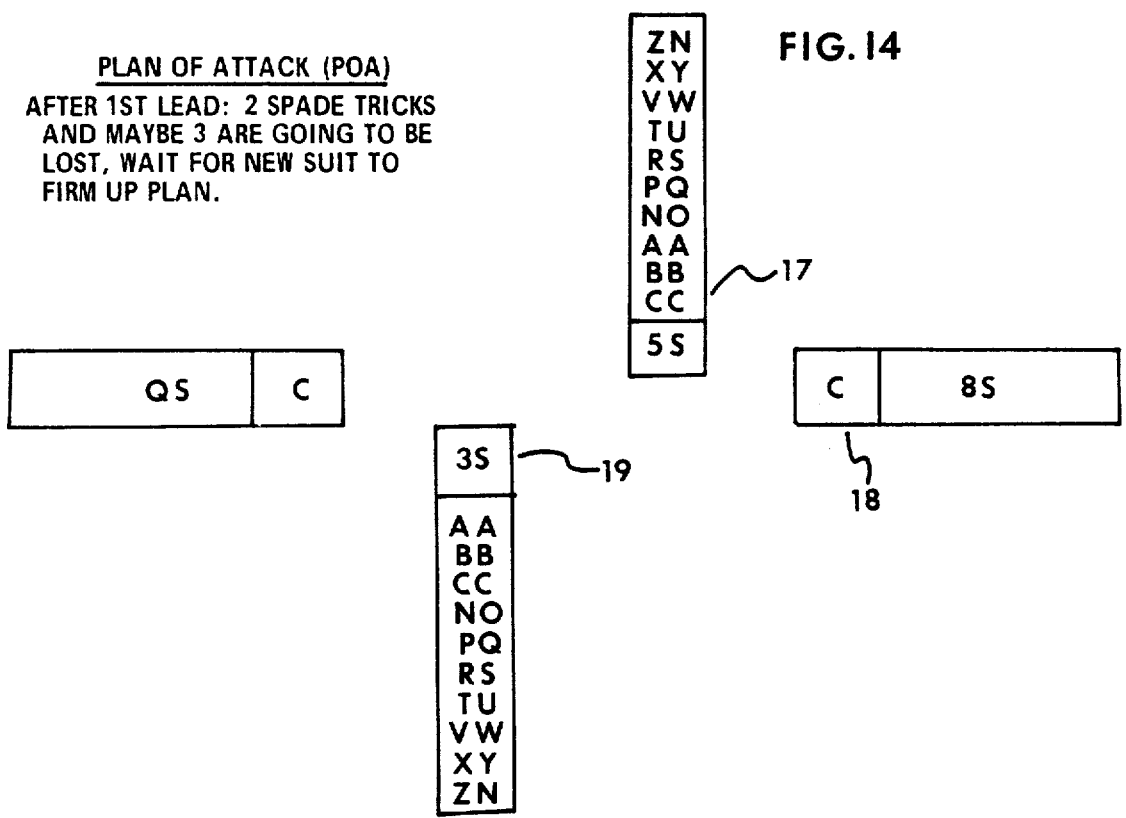

FIG. 14

PLAN OF ATTACK (POA)
AFTER 1ST LEAD: 2 SPADE TRICKS AND MAYBE 3 ARE GOING TO BE LOST, WAIT FOR NEW SUIT TO FIRM UP PLAN.

FIG. 15

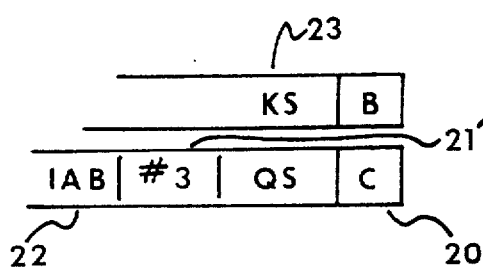

SEQUENCE ADJUSTMENT CUES (SAC)

1 IF TRUMPING IN ON A DIAMOND LEAD PLAY M-L-K IN WEST

2 IF DISCARDING ON CLUB QUEEN OR CLUB JACK PLAY H-J-I IN WEST

3 IF CONTRACT IS NO TRUMP LEAD "D"

4 IF DISCARDING ON A HEART LEAD PLAY D-E-F FROM EAST

5 IF PLAYING ON THE ACE OF CLUBS PLAY J-H-I FROM WEST
IF PLAYING ON THE QUEEN OR JACK OF CLUBS PLAY H-I-J FROM WEST

PLAN OF ATTACK (POA)

AFTER 1ST LEAD: 2 SPADE TRICKS AND MAYBE 3 ARE GOING TO BE LOST, WAIT FOR NEW SUIT TO FIRM UP PLAN.

AFTER 4TH LEAD: WHERE ARE THE KING OF CLUBS, THE KING OF HEARTS AND THE QUEEN OF DIAMONDS?

EAST BID CLUBS BUT IT WAS FORCED. WEST BID 2 NO-TRUMP ON HIS OWN, THAT SHOWS 16 POINTS AND HE'S SHOWN 9 IN SPADES ALREADY, WITH BOTH KINGS HE'S ONLY GOT 15 POINTS. HE MAY BE SHAVING IT 1 BUT I DOUBT 2, I'LL PLAY HIM FOR BOTH KINGS AND FINESSE THE QUEEN NOW. IF IT GOES AND THE HEARTS ARE SPLIT, I'M IN.

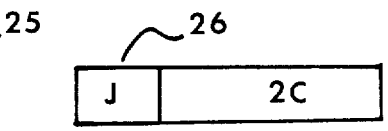

FIG. 16

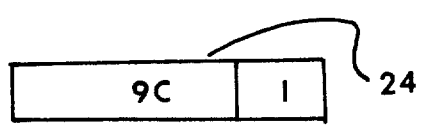

FIG. 17

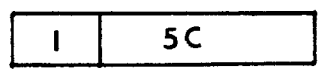

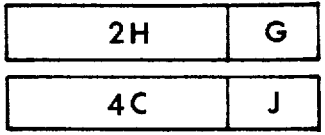

SEQUENCE ADJUSTMENT CUES (SAC)

1 IF TRUMPING IN ON A DIAMOND LEAD PLAY M-L-K IN WEST

2 IF DISCARDING ON CLUB QUEEN OR CLUB JACK PLAY H-J-I IN WEST

3 IF CONTRACT IS NO TRUMP LEAD "D"

4 IF DISCARDING ON A HEART LEAD PLAY D-E-F FROM EAST

5 IF PLAYING ON THE ACE OF CLUBS PLAY J-H-I FROM WEST IF PLAYING ON THE QUEEN OR JACK OF CLUBS PLAY H-I-J FROM WEST

PERTINENT INITIAL LEADS (PIL)

ANY CONTRACT PLAYED BY NORTH
EAST LEADS "A"

ANY CONTRACT PLAYED BY SOUTH
WEST LEADS "C"

CONTRACT BRIDGE DEVICE

BACKGROUND OF THE INVENTION

There are several background facts concerning the play of contract bridge that are pertinent to the examination and evaluation of the uniqueness of the invention. Contract bridge like most games has a precise statement of actions to be taken and actions forbidden in the conduct of the play. These are the "rules" of the game. The rules of the game are followed exactly by the invention.

Within the limits of the rules there are other sets of actions aimed at winning the game. These are the tactical systems of the play. While there is only one set of rules there are numerous tactical systems. It is solely with the tactical systems that the invention is concerned. The invention can employ any tactical system although the more generally known and accepted are the most commonly offered.

One warning about the tactical systems. All such systems have weaknesses of varying degrees where the user must make an interpretation. In the programming of the deal sheets of the following illustrative examples the plays selected are believed to be those the perfect bridge player would use. It is possible that users of the invention may dispute particular choices. It is important to realize that this is a criticism of the tactical system and not of the invention. Where this is important, and it is rarely so, explanation may be presented in the Pre-bidding Information, the Critique of the Bidding, the Plan of Attack or the Critique of the Play.

Another background fact of the play of contract bridge pertinent to the evaluation of the uniqueness of the invention is the distinct technical difference, yet interlocked dependence, of the bidding process and the playing of the hand. Each of these procedures is a distinctly different mental process or tactical procedure. Practice in one can be profitably pursued by itself and proficiency in one does not mean ability in the other. The invention provides the means of extensive practice in either or both.

Another characteristic of the conventional play of contract bridge that is self-evident but requires emphasis for background purposes is that conventional bridge play is, in final analysis, a team effort. The results of the play of one player can only be as good as the play of his partner permits. This fact of team play creates a tactical situation that must be recognized for background appreciation. For the execution of successful contract bridge bidding each partner must know which tactical system of bidding, including "conventions", he and his partner are using. Any device that does not impart this information in a timely manner to its user is not truly simulating the play of contract bridge.

SUMMARY OF THE INVENTION

The overall objective of the invention is to provide to the contract bridge world a simple, easily understood, easily operated, inexpensive device that will exactly simulate the play of three perfect bridge players when the device is operated by an actual solitary, fourth player.

Given realization of the overall objective it is envisioned that the device will permit provision of three specific services.

First, it will permit the provision of a perfect form of solitaire for any bridge player.

Secondly, it will permit the provision of a valuable teaching and learning aid to teachers and students of contract bridge.

Thirdly, it will permit the provision of a means of conducting competitive play between individuals as opposed to between teams or pairs of two.

The foregoing objectives are made attainable by the invention which is composed of three precisely oriented physical structures. First, a shallow rectangular tray (FIG. 1) of wood, plastic or similar material, that orients the other two structures. Second, a deal sheet (FIG. 2) or, square of paper containing precisely located banks or groupings of printed data uniquely arranged in two exact interlocked patterns, the bidding cross and the playing square. There is a specific deal sheet for each deal of bridge offered for play. Lastly, there is a template (FIG. 3), or a thin square of metal, wood, plastic or similar material, the same size as the deal sheet below and oriented there-to, having apertures fitted with slides and covers in such patterns as to exactly match the two interlocked data groupings of the deal sheet, permitting the timely exposure and concealment of segments of the data according to the rules for the employment of the invention.

The features of the invention absolutely essential to the unique overall characteristic functioning of the invention are the two original and unvariable patterns of data distributions upon the deal sheet, in the form of the bidding cross (FIG. 4) and the playing square (FIG. 5). Further, through their requirements for time to time exposure and concealment of segments of their printed patterns of data they dictate the design and functioning and orientation of the template and its slides and lids. The orientation for use of the template to the deal sheet is accomplished by the square receptical of the tray (1 FIG. 1). The rectangular area at the bottom of the tray (2 FIG. 1) is a buffer to protect the slides of the template if the device is used in other than a horizontal position. The recesses in the sides of the square of the tray permit the extensions of the slides of the simulated hands (3 FIG. 1).

BRIEF DESCRIPTION OF THE DRAWING

FIG. 4 is a plan view of the bidding cross;

FIG. 5 is a plan view of the playing square broken away in part;

FIGS. 6–11 show fragmentary parts of the bidding cross as they are exposed during a bidding sequence;

FIGS. 12–26 show fragmentary parts of the playing square as they are exposed during a playing sequence.

DETAILED DESCRIPTION AND FUNCTIONING OF THE INVENTION

As stated heretofore, the play of a deal of contract bridge requires the performance of two separate and distinct types of operations, bidding and playing. The invention recognizes this fact and presents two separate and distinct series of actions, each of which in its own right and without the other could contribute its own recreational, educational and even competetive benefits. Accordingly, each of these operations will be treated separately in the following description.

The Bidding Cross

Figure 3:
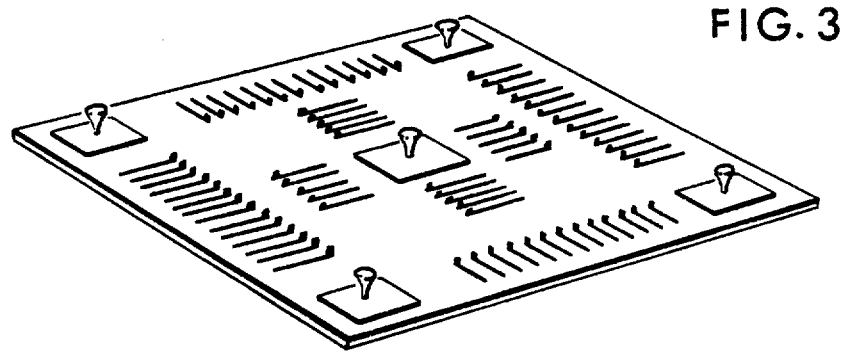
FIG. 3 is a perspective view of the template which is disposed over the sheet of FIG. 2 in the tray of FIG. 1.
Figure 2:
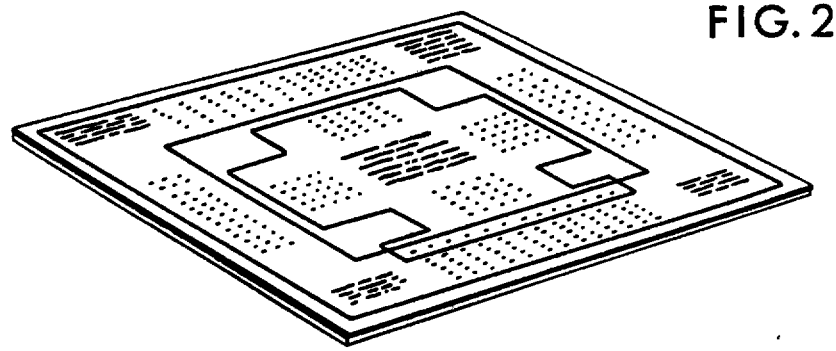
FIG. 2 is a perspective view of the sheet which has printed thereon the bidding cross and the playing square.
Figure 1:
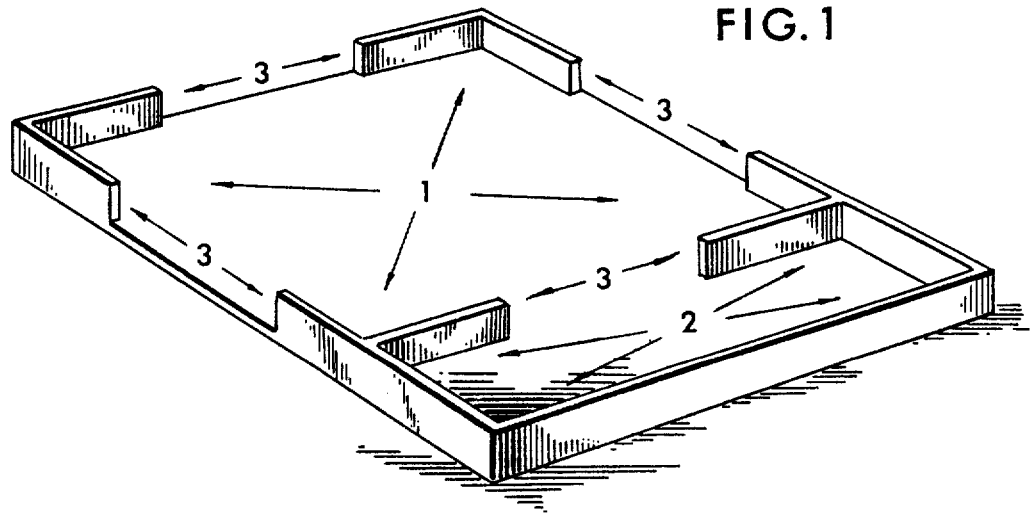
FIG. 1 is a perspective view of the orienting tray.
Figure 6:
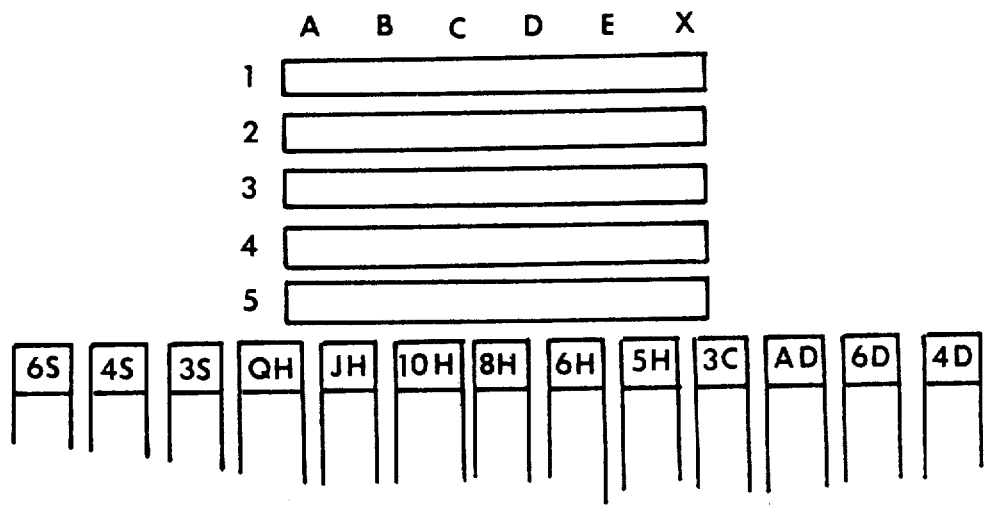

This illustration (FIG. 6) presents the invention as arranged for start of play. Hands are conventionally designated South, North, East and West. Note that the player's hand, South, is exposed as is the Pre-bidding Information in the center of the Bidding Cross. This amount of information is all that is necessary, but this much is imperative, for the player to have to enable him to make intelligent bids.

Figure 7:
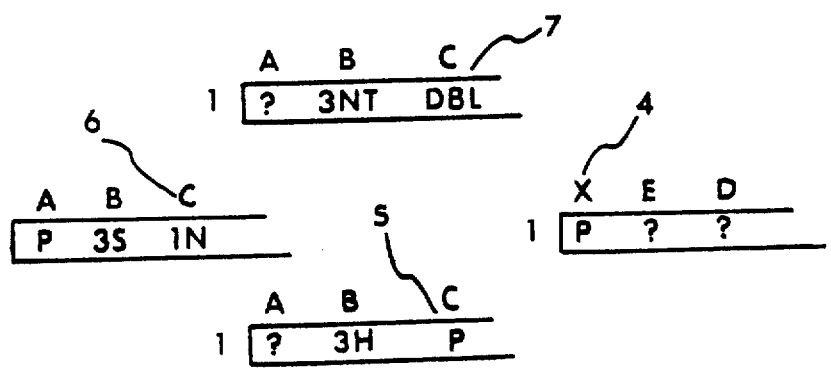

In the hand being illustrated (FIG. 7) the user of the invention learns from Pre-bidding Information that East dealt the hand and therefore by the rules of bridge, must be the first bidder.

Whenever the opening bid is in other than the user's hand the user simply opens the opening hand to "X" to find the bid. He then opens the "X's" of intervening hands up to his own. The user's choice of a bid then sets the pattern for succeeding bids by vertical coordinates in the same numbered line or in the succeeding line if the same line was used by a preceeding bid.

The user proceeds to uncover the column "X" bid of East in line #1 of the East bank of the Bidding Cross. This bid is a pass (4 FIG. 7).

The player now considering his hand and the bid of his opponent, East, decides to pass also. To register his "pass" upon the invention the player slowly opens the #1 slide in his Bidding Cross, stopping when he uncovers the letter "P" for pass (5 FIG. 7) which is under column C.

The player now must allow his opponent West to bid. This he does by moving West's #1 slide to uncover the indicia in column C. This bid of West's is 1 No Trump (6 FIG. 7).

The player must now register his partner North's bid which he does in the same manner as he did for West, uncovering column C. North's bid is a "double," (7 FIG. 7).

The player must now register East's second bid in response to the other bids. This he does by exposing the indicia under C in the 2nd line of his bank and finds that East has bid 2 Clubs (8 FIG. 8).

The player now, recalling that his partner is playing the system of Point Count Bidding (see Pre-play Information) decides to show the maximum strength of his hand and he decides to bid three Hearts which he does by uncovering the 3H indicia in line #2 of his Bidding Cross under column A (9 FIG. 8).

This in turn (10 FIG. 8) uncovers columns A in lines 2 of West and North and displays a pass for West and a four Heart bid for North. East passes in column A of line #3 (11 FIG. 8).

The player now decides to pass and does so by uncovering column B in line #3 in his own hand and that of West who also passes (12 FIG. 8). This completes the bidding, which is a contract of four Hearts to be played by South as the initial bidder of the Heart suit.

At this point the user normally will validate the bid he has contracted for. This is done by fully opening in turn the slides he has used in arriving at the contract. Under column "X" of each line used he will find the expert bid of each hand for that round of bidding and the proper, resulting contract (FIG. 9).

The number of possible sequences of bidding provided by the invention is limited only by the rules of the game, the nature of the deal, or, the spaces provided by the arbitrarily selected dimension of the arms of the Bidding Cross, whichever is the least. In the illustration example (FIG. 4) the spaces are thirty for each arm and three different sequences have been programmed which is ample to simulate the tactics of conventional bidding. However, other sequences could be added.

The flexibility of the Bidding Cross will now be demonstrated. Returning to the start of the bidding, two improper opening bids will be examined to indicate what contracts they might lead to.

For this example (FIG. 10) the player improperly decides to show his six card Heart suit and he bids one Heart (which is not there under Point Count Bidding) after East has passed the opening bid. This allows West to bid 1 Spade.

North, being an expert player and knowing that both his opponents are experts, while his partner is not, realizing in the light of the total point count of the bidding, that his partner has probably made an improper bid, makes a simple overcall, bidding two Hearts, West passes and so do North and East. The North-South hands have been grossly underbid.

Returning again to the start of the bidding, the player this time decides to make a three Heart opening bid (FIG. 11) thinking of it as a preemptive bid. West bids three Spades and North bids three No Trump and East passes. South passes and West passes refusing to double because he does not wish to give North the opportunity to bid four Hearts. The contract is three No Trump which cannot be made.

The question now arises as to the playing procedure to follow when the contract of the experts is different than that of the player. In the teaching and learning functions there is little to be gained by having the student play an improper contract. Accordingly, the proper contract of the experts is played and the improper contracts are ignored. In competition, bidding and playing will be scored seperately and relative proficiencies seperately established by arbitrary point systems.

This concludes a typical functioning of the invention's Bidding Cross and a demonstration of its unique capability of simulating exactly the bidding process of contract bridge when employed by a single individual.

An important aspect of the utilization of the Bidding Cross should be noted here. This is the fact that the Bidding Cross alone, as a seperate, distinct device, without the indicia columns of the playing square and the groupings of data that are a part of that square, serves a valid function in a unique manner, i:e:, assisting in the learning and teaching function of the bidding of contract bridge.

The Playing Square

The bid of four Hearts has been established for play by South. Employing the Playing Square to opening lead is made by the player uncovering the "Pertinent Initial Leads" aperture below West's hand (13 FIG. 12) and finding the indicia that marks the card, according to the contract, to be exposed in West's hand. In this case the indicia is "C" and the player in accordance with the rules of the play of the invention moves the slide in line "C" of West's hand to the rear only sufficiently to uncover the Queen of Spades "playing card indicia" (14 FIG. 12). This constitutes West's lead.

As in conventional bridge the player now uncovers his partner North's hand, by moving the slides back only so much as to not go beyond the line above the card indicia (15 FIG. 13).

At this point the player, as in conventional bridge, should study the board, recall the Pre-bidding Information and his opponent's bidding and formulate his sequence of play. Or, he can open the Plan of Attack box and play the hand with expert advice (16 FIG. 13). This is one of the unique features of this invention which in essence allows the student, or his teacher, to determine the degree of assistance to use at a given time. In competitive play such assistance can be easily and simply denied by sealing the aperture in the template or blotting out the printing on the Deal Sheet.

The player must now make the play from North, his partner, exactly as he would do in a conventional game, having no more nor any less information. He decides to play the 5 of Spades and to so indicate he pushes out fully the appropriate slide uncovering a column of two letter indicia (17 FIG. 14).

At this stage it is desirable to discuss and demonstrate one of the key techniques of the Playing Square and the invention. That is the Dual Indices Column. When a card is played in the course of a hand of contract bridge the player is doing one of four things. He is leading; he is following suit; he if trumping in; or he is discarding. The Dual Indices Column (17 FIG. 14) is so programmed, that when leading or following suit, the left column of letter indicia will indicate the proper play from the following hand. When trumping in or discarding the right hand column will perform the same function. For certain cards, as in this case, the two columns may be indentical in part or in whole.

This programming however, requires an instrument that will provide exceptions for the fact that there is more than one sequence of plays that can be employed in making or losing a given contract and that true simulation of conventional contract bridge play must provide for all such sequences including those that provide overtricks.

The instrument provided to augment the DIC programming (and other programming) and thereby preserve the breadth of the play of the invention is the Sequence Adjustment Cue "SAC" which will be explained later when it occurs in the course of the play.

In our example (17 FIG. 14) the left column is to be used because the 5 of Spades is following suit to the opponent's Queen of Spades. The several indicia in the columns are used in turn from the inside of the Playing Square to the outside, selecting the first indicia that has not been used. This will be indicated by the position of the slide of the corresponding line in the bank being played. If having been played the slide will be fully closed.

In our example the left indicia of the 5 of Spades indicates the following play of line "C" of East's hand which when uncovered by pushing its slide toward the outside of the Playing Square, proves to be the 8 of Spades (18 FIG. 14).

It is now the player's turn to play from his hand and he does so by pushing back the slide in the column of the 3 of Spades (19 FIG. 14). This play completes the trick.

The slides of the cards played are now closed fully except those of the winning hand which are fully opened (20 FIG. 15).

The problem is to determine the opponent's lead without imparting any untoward information to the user of the device, South.

First it is desirable to discuss and demonstrate another key technique of the Playing Square and the invention, the Sequence Adjustment Cue, SAC, mentioned before.

In this example the Sequence Adjustment Cue (21 FIG. 15) is used to provide for an alternate lead from the simulated West's hand. It is most frequently used to provide alternate plays other than leads in which case it is found in the user's hand or in his dummy. Each SAC consists of two parts, a numerical indicium and a narrative directive that sets forth the alternative actions. The numerical indicium will be found immediately outside of the card being played but under the slide and not visible until the decision has been made to play the card and the entire column outside the card indicia has been uncovered. The narrative directive will be found in the Sequence Adjustment Cues. in the upper right corner of the Playing Square listed in numerical sequence. The SAC is a simple statement of conditions that may or may not pertain at the time. If the statement of the cue applies then follow the instructions therein. If it does not apply then ignore the cue and proceed with the normal play.

It is desirable here to also explain the Single Indices Column "SIC," the device used to determine the lead from either of the simulated hands, East or West. When the slide of a winning card in East or West is moved fully to the outside the player will find a single line of letters. These letters, reading from inside to outside of the square, tell the user which slide in the same hand is to be lead in the next trick. On occasion this line of letters will be preceded by a SAC number that may or may not be pertinent.

In our example, moving the slide of the Queen of Spades to the outside uncovers first, the SAC #3 and then the line of indicia "B," "A," "I," reading from inside to outside of the square (22 FIG. 15). Referring to SAC #3 in the upper right corner of the Playing Square we see that it does not pertain. The contract is 4 Hearts. Accordingly, it is line "B" of West that holds the second lead of the game which when uncovered is the card indicia for the King of Spades (23 FIG. 15).

The next two tricks are exactly the same being taken by West with the King of Spades and the Ace of Spades successively and West has made his fourth lead with the 9 of Clubs (24 FIG. 16). South must win all other tricks or lose the contract.

South, the player, reviews his Plan of Attack and the board at this point and decides that he must and should attempt to finesse the Queen of Clubs from North (25 FIG. 16). This draws the 2 of Clubs from East (26 FIG. 16) and the 3 from South (27 FIG. 16) and the lead of the next trick is in North. South, the player, then wanting to get the lead to his hand leads the Jack of Clubs (28 FIG. 17) which indicates play of the line "J" in East. However, it is seen that line "J" has been played in a preceding trick and the slide is forward and closed, covering "J." Accordingly, indicium "I," just above "J" in the column of the Jack of Clubs is used and it plays the 5 of Clubs in East's hand (29 FIG. 17).

South now must "trump in" to prevent West's King of Clubs from taking the trick. To do this he decides to play the 5 of Hearts. Accordingly, he pushes the slide of the 5 of Hearts fully to the outside of the Playing Square (30 FIG. 17). The player notes that SAC #1 indicium is immediately to the outside of the 5 of Hearts indicium. On referring to the SAC #1 narrative he finds that the conditions for #1 do not pertain and he proceeds to the Dual Indices Column to determine the proper play for West to make.

An examination of the past completed tricks will show that each trick has used the left hand column to determine the play of the succeeding hand. However, the left hand column can only be used for such purpose if the card of that column is being used to lead or to follow the suit of a previous lead. The right hand column must be used when the card being played is a discard of a different suit or is "trumping in" on the hand.

Accordingly, by using the indicia "J" of the right hand column, because we are "trumping in" on a Club lead we find that "J" plays the 4 of Clubs from West's hand (31 FIG. 17).

If he had played "G" of the left hand column he would find that West would have played a 2 of Hearts (32 FIG. 17), a failure to follow suit and a violation of bridge rules.

Figure 18:
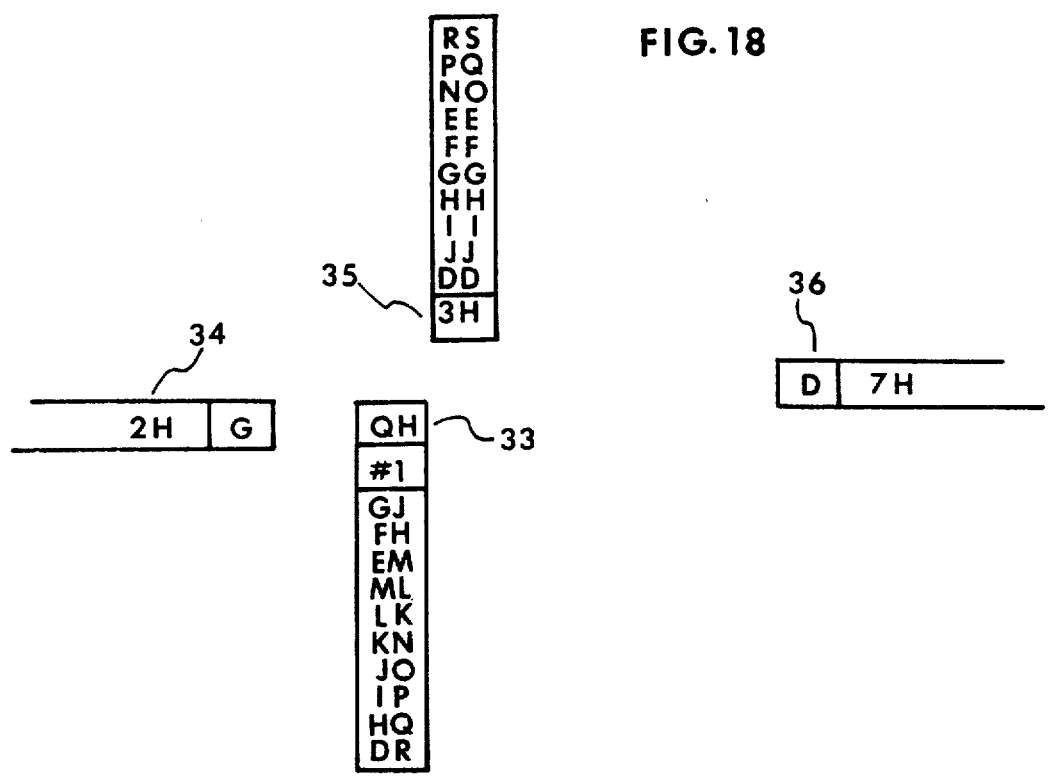

The player, South, now decides to run a trump looking for the King of Hearts which he feels sure is in West's hand. He leads the Queen of Hearts (33 FIG. 18), checks the SAC #1 if he has forgotten it, sees it does not pertain and uses the indicia "g" in the left column because he is "leading." West's response is the 2 of Hearts (34 FIG. 18). The player then plays the 3 of Hearts from North (35 FIG. 18) and this in turn plays "D," the 7 of Hearts from East (36 FIG. 18).

It is now apparent that both the King of Clubs and the King of Hearts are in West's hand and accordingly the hand can be made by South, this by finessing the King of Hearts and discarding a losing Diamond on North's Ace of Clubs leaving two winning Diamond tricks (the Ace and King) and the balance of the hand is trump.

At this point it is well to go back and illustrate the completely unique ability of the invention to adjust the outcome of the hand to less productive use by the player.

Figure 19:
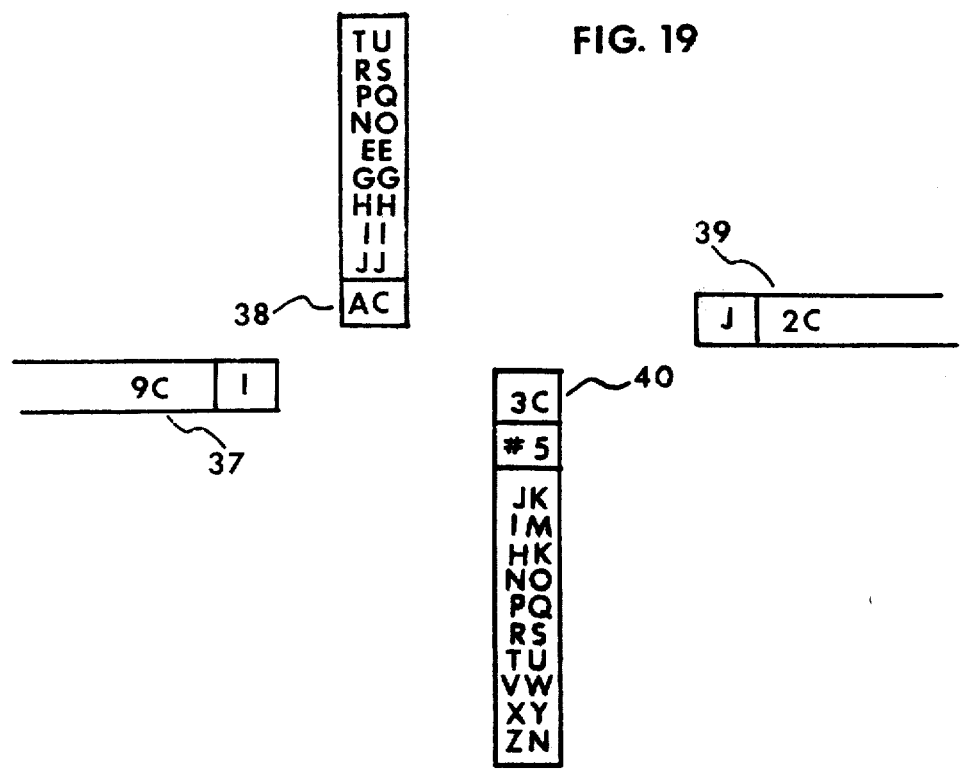

The first three Spade tricks have been taken by West and he has led the 9 of Clubs (37 FIG. 19).

Figure 20:
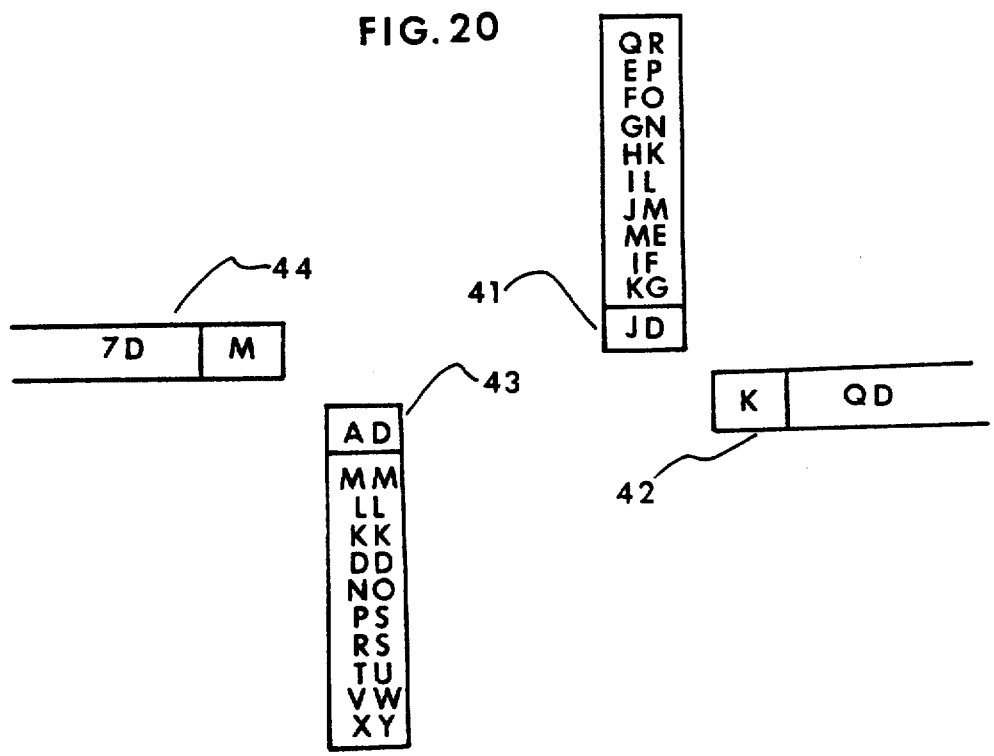

This time the player, South, decides not to finesse his Queen of Clubs but to take the trick with North's Ace (38 FIG. 19). The Ace in turn, with its indicia "J" causes East to play the 2 of Clubs (39 FIG. 19) and South puts on his lone 3 of Clubs (40 FIG. 19). The lead is now in North's hand and the player decides to bring the lead to his hand and run his trumps. He leads the Jack of Diamonds (41 FIG. 20) which plays "K" or the Queen of Diamonds from East (42 FIG. 20). South covers with the Ace (43 FIG. 20) which plays "M" or the 7 of Diamonds from West (44 FIG. 20).

Figure 21:
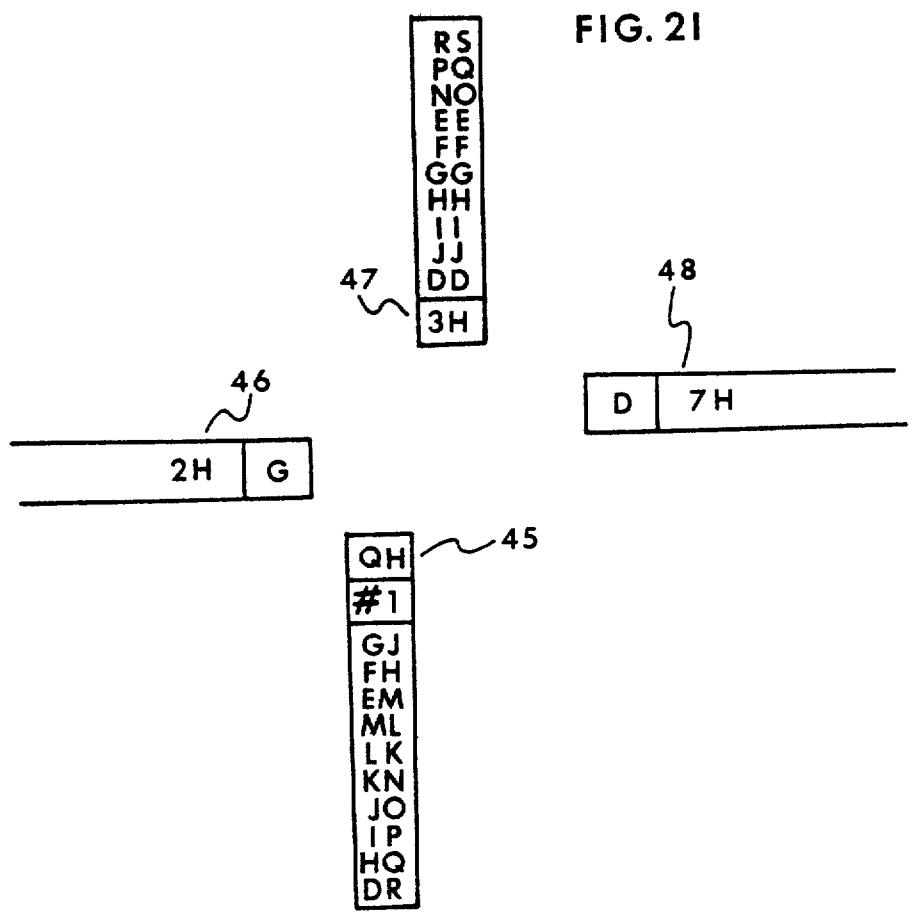

The lead is now in South and he plays the Queen of Hearts (45 FIG. 21) which plays "G" or the 2 of Hearts in West (46 FIG. 21). The player decides to finesse the Queen and plays the 3 of Hearts from North (47 FIG. 21) which plays the "D" or, the 7 of Hearts from East (48 FIG. 21).

Figure 22:
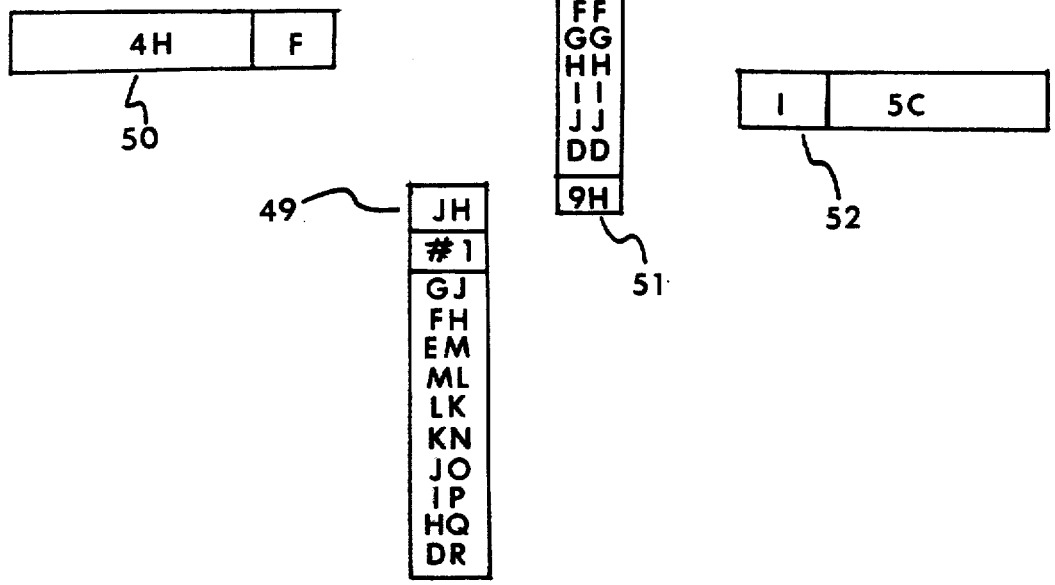

The trick is complete and South leads the Jack of Hearts from his hand (49 FIG. 22) which plays "F" or the 4 of Hearts from West (50 FIG. 22). South plays the 9 of Hearts from North (51 FIG. 22) and that plays "I" or the 5 of Clubs from East (52 FIG. 22). This completes the trick and the lead is in South's hand.

Figure 23:
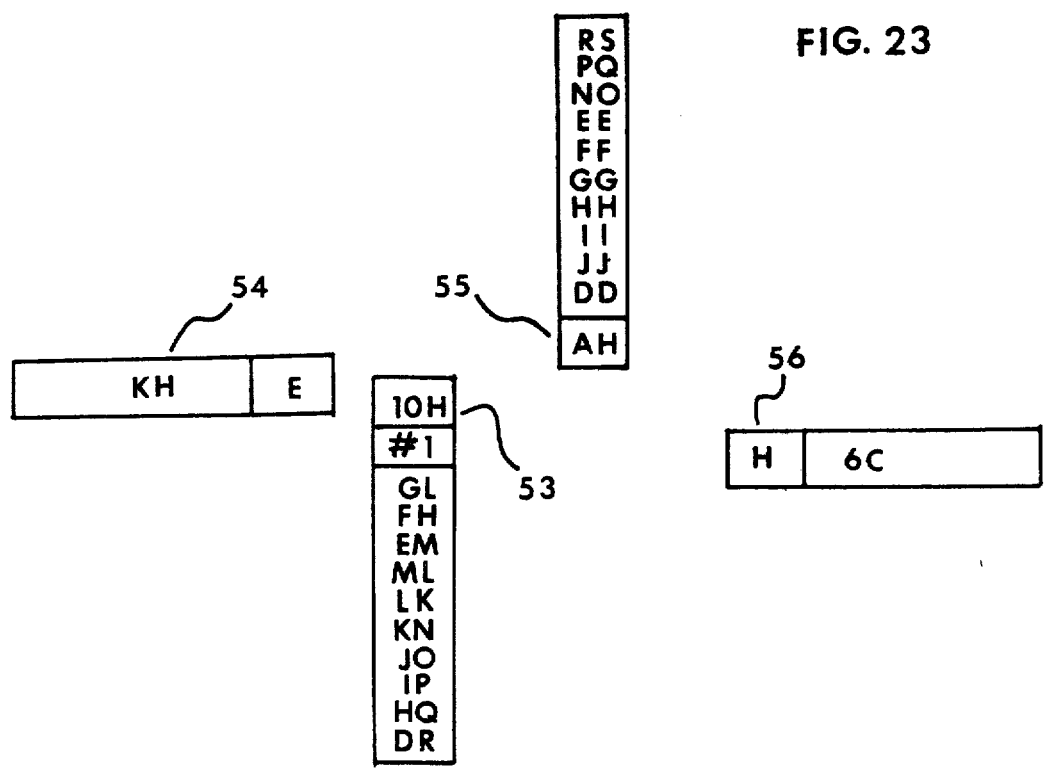

South now leads the 10 of Hearts (53 FIG. 23) which plays "E", the King of Hearts in West's hand (54 FIG. 23). North plays the Ace of Hearts (55 FIG. 23 which plays "H," the 6 of Clubs in East's hand (56 FIG. 23). This completes the trick and the lead is in North's hand.

Figure 24:
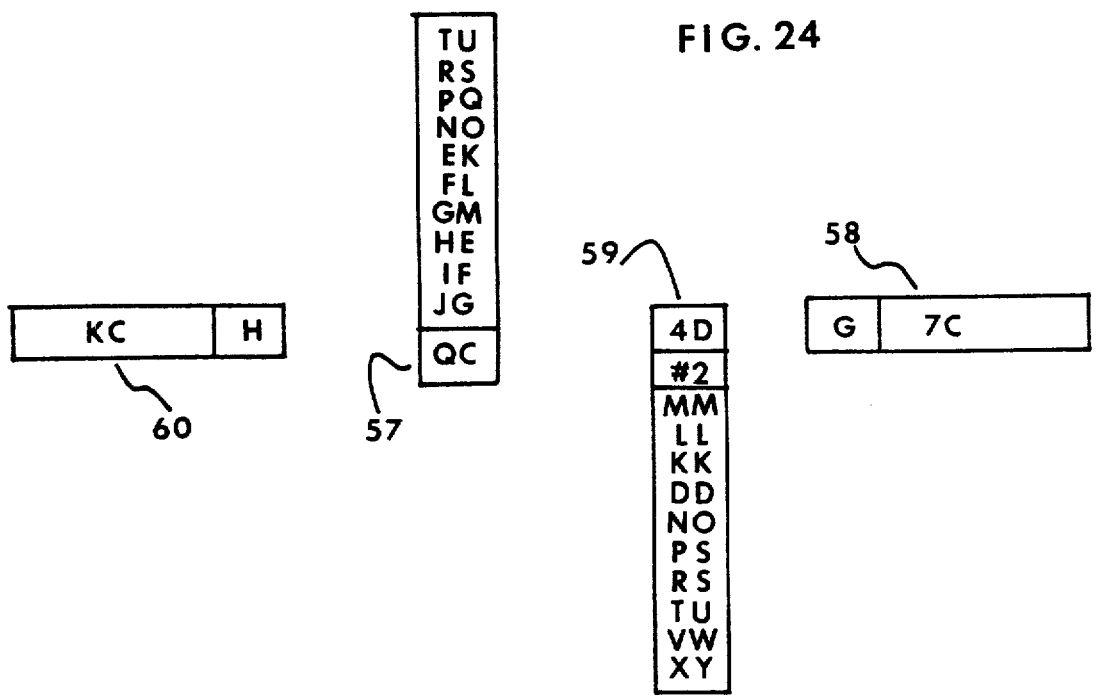

It is now apparent to South that the only way for him to make his contract is for the King of Clubs to be in East's hand. He therefore leads the Queen of Clubs (57 FIG. 24) which plays "G" or the 7 of Clubs from East's hand (58 FIG. 24). South now discards the 4 of Diamonds (59 FIG. 24) and using SAC #2 plays "H" or the King of Clubs from West (60 FIG. 24) which takes the trick. The contract is set. Had the last trick been trumped in South then West would have played "J" or the 4 of Clubs. This play however, would leave South with a losing Diamond trick and the contract is still set.

To this point it has been demonstrated that the Playing Square can play a proper contract both properly and improperly. It is also obvious that a lesser or greater contract in the same suit can be so played. In production models of the invention these capabilities are probably all that would be utilized. However, the invention has the ability to play an improper contract in other suits when so programmed. This ability stems from the capacity of the Dual Indices Columns and the Sequence Adjustment Cues to provide the requisite flexibility in the programming system.

Figure 25:
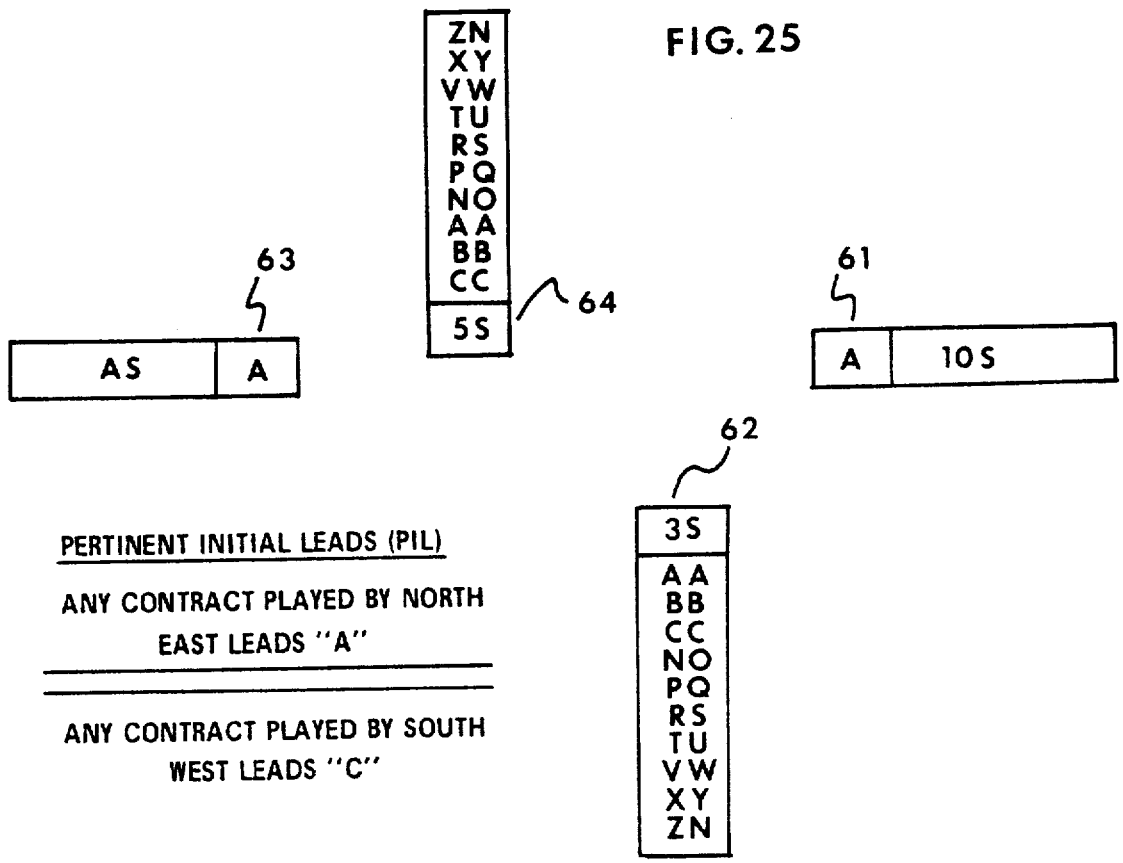

A brief example of the play of an improper contract in an improper suit follows. Returning to FIG. 11 assume that South passes the three No Trump bid of North and the contract is three No Trump for North to make. West does not double this contract because he judges that would force North into a four Heart contract which might be made. Reference to the "Pertinent Initial Lead" aperture of the Playing Square finds that it says "any contract played by North, East leads "A"." This lead is the 10 of Spades (61 FIG. 25) and it draws the 3 of Spades (62 FIG. 25) from South which in turn plays the Ace of Spades in West (63 FIG. 25) and North plays the 5 of Spades (64 FIG. 25) as the final trick of the hand. The King of Spades lead from West takes another Spade trick and in turn so does the Queen of Spades.

Figure 26:
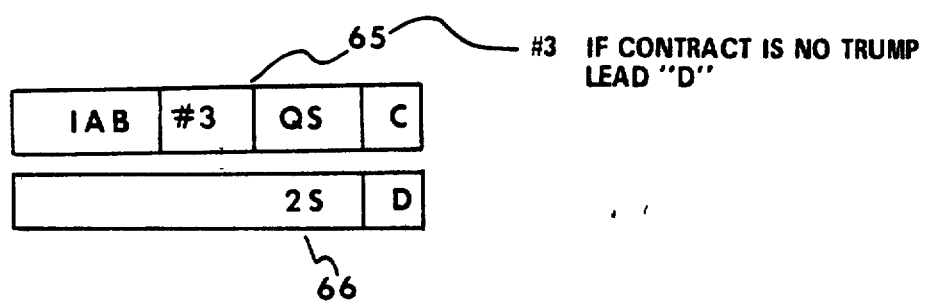

When the slide of the Queen of Spades is moved to the outside to determine West's lead at this stage (65 FIG. 26), it is seen that a Sequence Adjustment Cue #3 is uncovered; this SAC #3 says "if playing No Trump, lead "D"." Accordingly West leads "D," the thirteenth Spade, the 2 which is a good trick (66 FIG. 26). North cannot lose another trick and make his contract. In the interest of brevity this hand will not be played out. But, the fact is that North must lose one Diamond trick and accordingly the contract would be set.

This capacity of the device to execute the play of losing contracts is another demonstration of its ability to simulate the conventional play of contract bridge.

What is claimed is:

1. A device that permits a solitary user to bid a multiplicity of simulated hands of contract bridge in the same technical manner as he would be able to do as a member of a conventional foursome and which is composed of three major components; one being an orienting tray of dimensions determined by the other components; another being a template having groupings of apertures, fitted with slides or covers designed and arranged to make possible the timely exposure and/or concealment of lines and columns, and a center box of data; imprinted upon a sheet of paper, one for each hand to be bid, each of which constitutes a third component of the device which in detail is; a printed geometric figure in the form of an even armed cross of practical with and heighth with each of the four arms divided into a suitable number of intersecting lines and columns forming square spaces that can be and are cross indexed by letter and numerical indices so that each square in each arm bears the same indices as the corresponding squares in all other arms and this permits the presentation of a plurality of rounds, each of four possible contract bridge bids in the form of playing card indicia and numerals to be printed in said squares using the top line of the arms for the first four bids and progressing downward through the arms of the cross for succeeding sequences of bids until the required number of bidding sequences for the hand being bid according to the rules of contract bridge has been executed and a contract established; and at the bottom leg of the cross is the hand being bid in a line of playing card indicia while in the center of the cross in the box formed by the interior dimensions of the cross there is printed the minimum information that must be known before proper bidding can be initiated.

2. A device that permits a solitary user to play a multiplicity of simulated hands of contract bridge in the same technical manner as he would do as a member of a conventional foursome and which is; composed of three major components; one being an orienting tray of dimensions determined by the other components; another being a template having groupings of apertures each fitted with slides or covers designed and arranged to make possible the timely exposure and concealment of lines, and columns, and boxes of data, imprinted upon a sheet of paper, one for each hand to be played, each of which constitutes a third component of the device which in detail is; a geometric figure in the printed form of two concentric squares (or rectangles or a rectangle and a square) one within the other with sides parallel and an optimum distance apart and then subdivided into corner squares and resulting side rectangles modified in minor degrees to accommodate the imprinting in each of the rectangles a hand of thirteen playing card indicia; and in the top and bottom rectangles, each such indicium having between it and the outside side of the rectangle a dual column of letter indices; and in each of the side rectangles between each playing card indicium and the outside side of the rectangle a single line of letter indices keyed to card indicium in the same hand to determine leads if said cards take tricks; and between each playing card indicium and the inside of the side rectangles a letter indicium keyed to letters in the dual column indices of the preceding hand thus identifying the cards to be played in response to the cards of the two open hands; and between each playing card indicium of each rectangle and its column of indices a space that may or may not contain a numerical indicium identifying an appropriate adjustment of the sequential play by referring to such directions printed in one of the corner boxes of the square; and in other corner boxes of the square the pertinent lead, the plan of playing, and the critique of the proper play; and in another box in the center of the square the essential pre-play information including pre-bidding information, the bidding sequences and the contract to be made.

3. A device that permits a solitary user to bid and then to play a multiplicity of simulated hands of contract bridge in the same technical manner as he would be able to do as a member of a conventional foursome; and which device is composed of three major components; one component being an orienting tray of dimensions determined by the other components; another component being a Template having groupings of apertures, fitted with slides or covers designed and arranged to make possible the timely exposure and/or concealment of lines and columns; and a third component of the device which in detail is; a printed geometric figure in the form of an even armed cross of practical width and heighth with each of the four arms divided into a suitable number of intersecting lines and columns forming square spaces that can be and are cross indexed by letter and numerical indices so that each square in each arm bears the same indices as the corresponding squares in all other arms; this permits the presentation of a plurality of rounds, each of four possible contract bridge bids in the form of playing card indicia and numerals to be printed in said squares using the top line of the arms for the first four bids and progressing downward through the arms of the cross for succeeding sequences of bids until the required number of bidding sequences for the hand being bid according to the rules of contract bridge has been executed and a contract established; and at the bottom leg of the cross is the hand being bid and played in a line of playing card indicia and; then in order to play the hand just bid, in the same technical manner as would be done by a member of a conventional foursome, there is the Playing Square; a geometric figure in the printed form of two concentric squares (or rectangles or a rectangle and a square) one within the other with sides parallel and an optimum distance apart and then subdivided into corner squares and resulting side rectangles modified in minor degrees to accomodate the imprinting, in each of the rectangles of a hand of thirteen playing cards indicia; and in the top and bottom rectangles, each such indicium, having between it and the outside side of the rectangle, a dual column of letter indices and in each of the side rectangles between each playing card indicium and the outside of the rectangle a single line of letter indices keyed to card indicium in the same hand to determine leads if said cards take tricks; and between each playing card indicium and the inside of the side rectangles a letter indicium keyed to letters in the dual column indices of the preceding hand thus identifying the cards to be played in response to the cards of the two open hands; and between each playing card indicium of each rectangle and its column of indices a space that may or may not contain a numerical indicium identifying an appropriate adjustment of the sequential play by referring to such directions printed in one of the corner boxes of the square labeled "Sequence Adjustment Cues" and in other corner boxes will be imprinted the pertinent leads, the plan of playing and the critique of the proper bidding and play.

* * * * *